United States Patent [19]
Shiber

[11] 3,936,016
[45] Feb. 3, 1976

[54] AIRPLANE'S ANTI-WHEEL-LOCK AND SPIN-UP SYSTEM

[76] Inventor: Samuel Shiber, P.O. Box 302, Des Plaines, Ill.

[22] Filed: Apr. 29, 1975

[21] Appl. No.: 572,844

Related U.S. Application Data

[63] Continuation-in-part of Ser. No. 440,860, Feb. 8, 1974, Pat. No. 3,881,783.

[52] U.S. Cl............ 244/103 S; 303/10; 303/21 F
[51] Int. Cl.².............................. B64C 25/32
[58] Field of Search ...... 303/21 F, 10, 21 B, 21 BB; 188/181 A, 181 R; 180/82 R; 244/111, 103 S, 103 R, 110 A, 110 H

[56] References Cited
UNITED STATES PATENTS

| | | |
|---|---|---|
| 2,480,651 | 8/1949 | Hawkins et al............... 244/103 S |
| 3,096,052 | 7/1963 | Hardigan....................... 244/103 S |
| 3,542,318 | 11/1970 | Ellsworth...................... 244/103 S |
| 3,866,860 | 2/1975 | Opitz............................ 244/103 S |

*Primary Examiner*—Geroge E. A. Halvosa
*Assistant Examiner*—Douglas C. Butler
*Attorney, Agent, or Firm*—Samuel Shiber

[57] ABSTRACT

A system for spinning up a nose wheel of an airplane equipped with a Fixed Slip Hydraulic Anti-Lock Braking System, incorporated in the airplane's anti-lock system. The system includes a main wheel pump coupled to a main wheel which is hydraulically coupled to a nose wheel pump-motor.

6 Claims, 4 Drawing Figures

AIRPLANE'S ANTI-WHEEL-LOCK AND SPIN-UP SYSTEM

CROSS REFERENCE TO RELATED APPLICATIONS

This application is a continuation in part of my parent copending application for a Fixed Slip Hydraulic Anti-Lock Braking System Ser. No. 440,860 which was filed on Feb. 8, 1974, now U.S. Pat. No. 3,881,783 and which is hereby incorporated by reference.

BACKGROUND OF THE INVENTION

When an airplane is landing on a gravel runway it normally touches down first with its main wheels, and shortly thereafter with its nose wheel. When a stationary wheel contacts the gravel it "plows" for a short time until it is being spun-up by the contact with the ground. When such plowing occurs, stones and dirt are often being thrown upwards. Now, if the airplane happens to be equipped with jet engines which are stradle mounted on the rear portion of the fuselage, there is a real danger that the debris raised by the nose wheel will be sucked by the engines, potentially damaging their internal parts.

It has been established that the amounts of debris raised by the nose wheel can be minimized by spinning-up the nose wheel prior to its touch-down.

SUMMARY OF THE INVENTION

The present invention relates to an airplane's landing gear, particularly to a tricycle type landing gear which is equipped with an anti-lock braking system of the type described in the parent application, wherein hydraulic pumps are coupled to the airplane's wheels.

The main object of the invention is to provide a wheel spin-up system at a minimum weight and cost penalty by designing it as a part of the anti-lock system, i.e., by utilizing the anti-lock system's pumps and plumbing.

In the first embodiment of the present invention the main wheels pumps are utilized as a power source to drive the nose wheel pumps (which, during the spin-up process operate as hydraulic motors, and therefore will be referred to, during the rest of this application as "pump-motor"), and thereby spin-up the nose wheel. This process starts at the moment that the main wheels touch down and continues until the nose wheel touches down. Thus according to the first embodiment of the present invention no external energy source is required.

A second embodiment of the present invention uses an external source of pressurized fluid and valving means to direct fluid to the nose wheel pump-motor, (or pump-motors), and optionaly also to the main wheels pumps, if spinning them up is also required.

At this point some of the practical consideration related to the first and second embodiments will be discussed; the first embodiment is simple and inexpensive, requiring a minimal amount of modification of an airplane having an anti-lock system of the type shown in the parent patent application. The limitation of this system stems from the fact that the system has a relatively short time to spin-up the nose wheel, which in turn may call for larger pumps and pump-motors to be able to accomplish the desired spin-up in this short a time. In an extreme case, where the landing is abnormal and the nose wheel touches down before the main wheels do, this embodiment does not get any chance to accomplish the spin-up.

The second embodiment uses an external source of pressurized fluid which is directed to the pump-motors and accomplishes the spin-up. This embodiment does not have the limitation discussed in connection with the first embodiment since the spin-up can be started several minutes before the touch down. If the airplane has an existing pressure source on board that can be tapped for this function, the second embodiment may be preferred. If a separate pressure source is required the first system may be given preference.

DETAILED DESCRIPTION OF THE FIGURES

It may be noted that same numerals will be used to indicate same parts throughout the figures.

Figure 1:
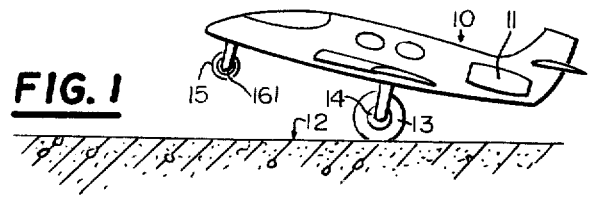
FIG. 1 shows a business type jet airplane having stradle mount jet engines attached to the rear sections of its fuselage, at the moment of touch down.

FIG. 1 shows a small jet plane 10 having two jet engines 11 (one shown) mounted on the rear section of its fuselage, at the instant of touch down on a runway 12. The airplane has two main wheels 13 (one shown) each driving a pump 14, and a nose wheel 15 coupled to a pump-motor 161.

Figure 2:
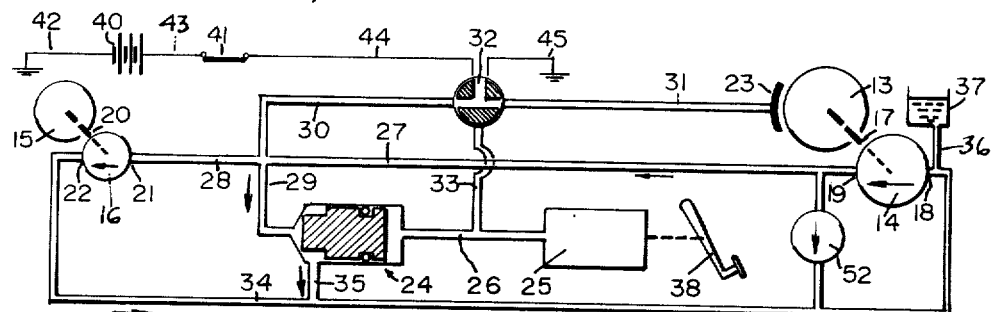
FIG. 2 shows an unmodified anti-lock system of the type described in my parent application.

FIG. 2 shows for reference and for the reader's convenience an unmodified Fixed Slip Hydraulic Anti-Lock Braking System of the type that is shown in the parent patent application. I will briefly describe this system and its operation:

the main wheel pump 14, which is coupled to the main wheel 13 by a shaft 17 and has a suction port 18 and a discharge port 19, the nose wheel pump 16 which is coupled to the wheel 15 by a shaft 20 and has an inlet port 21 and an outlet port 22, a hydraulically actuated foundation brake 23 for braking the main wheel 13, a slave relief valve 24 coupled hydraulically to a master-cylinder 25 by a line 26, for limiting the pressure generated by the anti-lock braking system in the foundation brake 23, and conduit means 27, 28, 29 and 30 mutually connecting the discharge port 19, inlet port 21, foundation brake 23 and slave relief valve 24 one to the other. A portion of conduit means 30 indicated by numeral 31 is separated by a three way solenoid valve 32 which can alternatively connect conduit means 31 to a line 33.

Return lines 34 and 35 complete the hydraulic circuit and a line 36 connects a reservoir 37 to conduit means 34. The reservoir 37 is connected as close as possible to the suction port 18 to minimize the tendency of the pump 14 to cavitate, by minimizing the length of the tube between the suction port 18 and the point along conduit 34 at which atmospheric pressure is introduced through the reservoir 37.

The pumps 14 and 16 are sized so that when the airplane rolls on the runway and its wheels roll without slip the pump 16 will suck only 80% of the hydraulic fluid that is discharged by the pump 14. The remaining 20% (which will be referred to as "differential pumping " from now on) will escape through the slave relief valve 24 to the return line 34. As the pilot increases his pressure on a brake pedal 38 of conventional master-cylinder 25 he proportionally increases the pressure that is required for the differential pumping to escape through the slave relief valve 24, which pressure also appears at the foundation brake 23 decreasing the speed of the main wheel 13. Eventually, as the main wheel peripheral speed slows to approximately 20% below the peripheral speed of the nose wheel 15 the differential pumping disappears and a state of a dynamic equilibrium is established between the anti-lock system and the rolling braked wheel 13.

Figure 3:
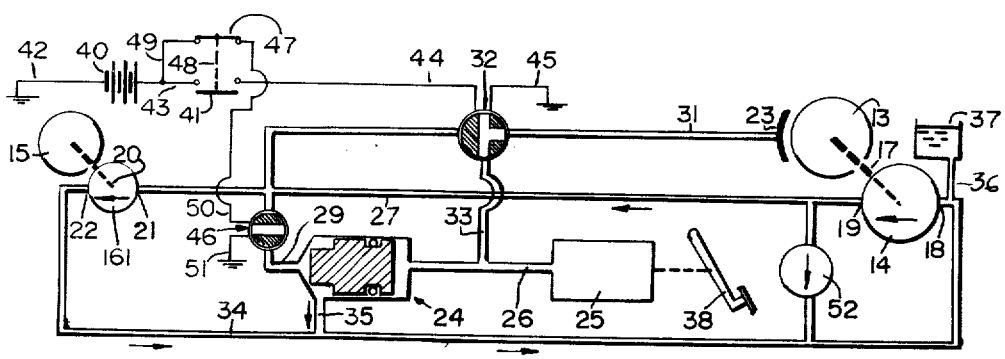
FIG. 3 shows a schematic layout of the first embodiment of the present invention.

The solenoid valve 32 is shown in its energized position, energized by battery 40 through a switch 41 via wires 42, 43, 44 and a grounding wire 45. When deenergized, the solenoid valve 32 blocks line 30 and connects the line 31 to the line 33 giving the pilot a direct manual control of the foundation brake 23. An excess pressure relief valve 52 prevents the pressure in the conduit means from exceeding a safe predetermined pressure at any time. FIG. 3 shows the anti-lock system of FIG. 2 modified to also spin-up the nose wheel according to the first embodiment of the present invention. The modifications are:

a. The pump 16 is replaced with a pump-motor 161 which is a unit which can operate either as a pump or as a hydraulic motor (such pump-motors are readily available commercially, and a number of ordinary gears or pistons pumps can operate as hydraulic motors).
b. A two way solenoid valve 46 is inserted into the line 29.
c. Additional control circuitry is added in the form of a switch 47 that, when closed, will automatically open the switch 41 through a mechanical link 48, which is made of an electrically isolating material and which is mechanically affixed to the switch 47 but not to the switch 41, consequentially the opening of the switch 41 will not effect the switch 47.

Operation of the second embodiment is as follows; prior to landing the pilot closes the switch 47, thereby also opening the switch 41. The closure of the switch 47 energizes the solenoid valve 46 through wires 49, 50 and a grounding wire 51, and the solenoid valve 46 then blocks the line 29, as shown in FIG. 3. The opening of the switch 41, as explained before, connects the foundation brake 23 to the master-cylinder 25 as shown in FIG. 3. When the main wheel 13 touches the runway 12 it starts to rotate, causing therefor the rotation of the pump 14 which then forces fluid into the conduit means 27. Since the line 29 is blocked the fluid has to pass through the pump-motor 161 spinning it and spinning the nose wheel 15 which is coupled to the pump-motor 161. The excess pressure relief valve 52 prevents the pressure in the conduit means from exceeding a predetermined level. After the nose wheel also touches the ground the pilot may open the switch 47 to make the spin-up system inoperative and may also close the switch 41 to revert the system from a manual mode of operation to an anti-lock mode of operation. As the airplane slows down the pilot can reopen the switch 41 and revert the braking system back to the manual mode of operation which may be preferable at low speeds.

Figure 4:
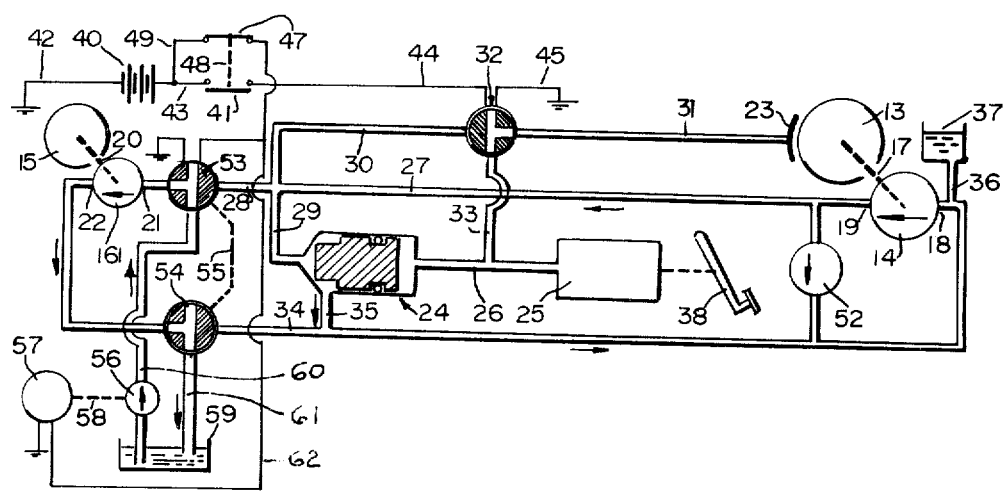
FIG. 4 shows a schematic layout of the second embodiment of the present invention.

FIG. 4 shows how the second embodiment of the present invention is formed by modifying the system of FIG. 2. In this case the modifications include:
a. Inserting two three way solenoid valves 53 and 54 which are mutually synchronized by a mechanial link 55, into conduits 28 and line 34, respectively.
b. Adding a hydraulic source of pressurized fluid in the form of a pump 56 driven by a motor 57 through a shaft 58, the pump's output being fed to the solenoid valve 53 and the pump's input being received from the solenoid valve 54 through a reservoir 59.
c. Adding a switch 47 and solenoid circuitry as in the first embodiment of FIG. 2, which in this embodiment energizes solenoid valves 53 and 54 simultaneously (instead of energizing only the solenoid valve 46 of FIG. 3).

To spin-up the wheels with the system as described in the second embodiment the pilot closes the switch 47 (as in the first embodiment) which in turn:
a. Energizes the solenoid valve 53 (as shown in FIG. 4) connecting a discharge line 60 of pump 56 to the inlet port 21 of pump-motor 161.
b. Energizes the solenoid valve 54 (as shown in FIG. 4) connecting a return line 61 leading to the reservoir 59 to outlet port 22 of pump-motor 161.
c. Energizes the motor 57 via a wire 62.

Consequentially, the pump 56 will force flow through the pump-motor 161 and thus spinning the nose wheel 15. The closing of the switch 47 automatically opens the switch 41 (as in the case of the first embodiment) which in turn connects the foundation brake 23 to the master cylinder 25 which serves as an alternate pressure generating means for actuating the foundation brake 23 during the spin-up.

A point that may be noted is; the sequence of opening of the switch 47 and closing of the switch 41 may be tied, automatically, to the touch down of the nose wheel. This touch down may be sensed at the front wheel strut mechanism, in a conventional manner known and used in the art. The reopening of the switch 41 may be tied, automatically, to the ground speed of the airplane decreasing below a certain value as shown in detail in the parent application.

While the present invention has been illustrated by a limited number of embodiments, it will be appreciated that modifications and substitutions can be made by one skilled in the art without departing from the spirit of the invention and the scope of the claims.

I claim:
1. In an airplane's landing gear, a hydraulic anti-lock braking and a nose wheel spin-up system comprising in combination;
   a main wheel pump coupled to a main wheel and having a suction port and a discharge port,
   a nose wheel pump-motor coupled to a nose wheel and having an inlet port and an outlet port,
   conduit means connecting said discharge port to said inlet port, for hydraulically coupling said nose wheel to said main wheel so that said main wheel will spin up said nose wheel during the initial period of landing during which said main wheel is in contact with the ground and is rotating on it and said nose wheel is still air-borne.
2. In an airplane's landing gear, a hydraulic anti-lock braking and a nose wheel spin-up system comprising in combination;
   a main wheel pump coupled to a main wheel and having a suction port and a discharge port, a nose wheel pump-motor coupled to a nose wheel and having an inlet port and an outlet port,
a hydraulically activated foundation brake for braking said main wheel,
a slave relief for limiting the pressure at the foundation brake,
conduit means mutually connecting said discharge port, said inlet port, said foundation brake and said slave relief valve one to the others, and
valve means for blocking said slave relief valve and said foundation brake from said conduit means so that said main wheel will spin up said nose wheel during the initial period of landing during which the main wheel is in contact with the ground and is rotating on it and said nose wheel is still air-borne.

3. In an airplane's landing gear a hydraulic anti-lock braking and a nose wheel spin-up system comprising in combination;
a main wheel pump coupled to a main wheel and having a suction port and a discharge port,
a nose wheel pump coupled to a nose wheel and having an inlet port and an outlet port,
a hydraulically activated foundation brake for braking said main wheel,
a slave relief valve hydraulically coupled to a master-cylinder for limiting the pressure at the foundation brake,
conduit means mutually connecting said discharge port, said inlet port, said foundation brake and said slave relief valve one to the others, and
valve means for connecting said foundation brake to said master-cylinder and for blocking said foundation brake and said slave relief valve from said conduit means so that said main wheel will spin up said nose wheel during the initial period of landing during which the main wheel is in contact with the ground and is rotating on it, and said nose wheel is still air-borne, while at the same time giving the pilot a manual braking capability through said master-cylinder.

4. In an airplane's landing gear, a hydraulic anti-lock braking and a nose wheel spin-up system comprising in combination;
a main wheel pump coupled to a main wheel and having a suction port and a discharge port,
a nose wheel pump-motor coupled to a nose wheel and having an inlet port and an outlet port,
a hydraulically activated foundation brake for braking said main wheel,
conduit means mutually connecting said discharge port, said inlet port and said foundation brake,
a hydraulic source of pressurized fluid, and
valving means for disconnecting said inlet port from said conduit means, and for connecting it to said hydraulic source for spinning up said nose wheel.

5. The system of claim 4 wherein said valving means also connect said foundation brake to an alternate brake actuating pressure generator while said nose wheel is being spun-up.

6. The system of claim 4 wherein said valving means also connect said outlet port by a return line to said hydraulic source of pressurized fluid.

* * * * *